Figure 1:
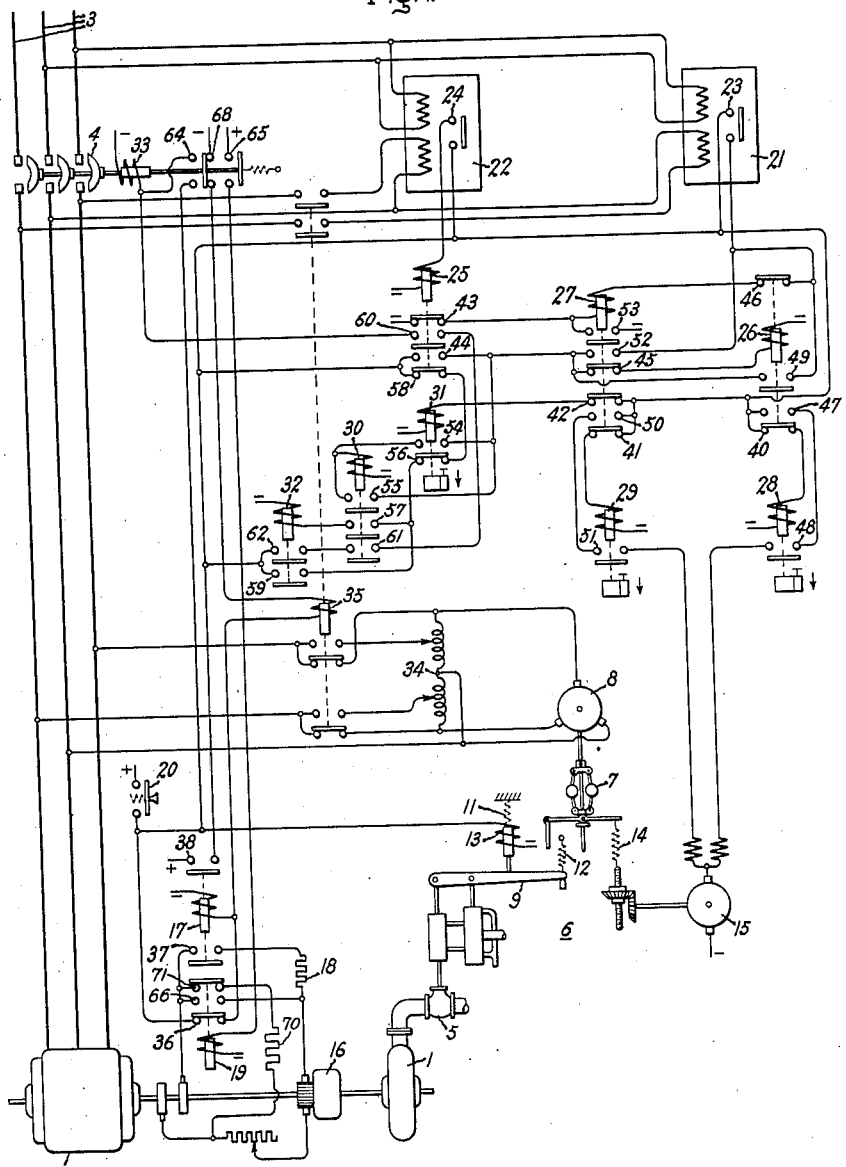

Feb. 16, 1943. H. T. SEELEY 2,311,476
CONTROL EQUIPMENT FOR PRIME MOVER ELECTRIC GENERATING PLANTS
Filed May 13, 1942

Inventor:
Harold T. Seeley,
by Harry E. Dunham
His Attorney.

Patented Feb. 16, 1943

2,311,476

UNITED STATES PATENT OFFICE 2,311,476

CONTROL EQUIPMENT FOR PRIME MOVER ELECTRIC GENERATING PLANTS

Harold T. Seeley, Lansdowne, Pa., assignor to General Electric Company, a corporation of New York Application May 13, 1942, Serial No. 442,748

19 Claims. (Cl. 290—4)

My invention relates to control equipments for prime mover electric generating plants and particularly to equipments for synchronizing a prime mover driven synchronous generator with an energized alternating current system.

When a large synchronous generator is automatically synchronized at normal voltage, a very expensive automatic synchronizer is required in order to prevent the generator from being connected to the system under frequency or voltage conditions which will effect serious system disturbances. However, from an economical standpoint, the use of such expensive automatic synchronizers is not warranted for controlling the synchronizing of small generators. In order to provide a relatively inexpensive automatic synchronizer for a small generator which does not result in serious system disturbances when the generator is connected to the system, various arrangements have been proposed for first exciting the generator so as to produce a subnormal voltage, then connecting the subnormally excited generator to the system when the speed of the generator is a predetermined value and a predetermined phase relation exists between the subnormal voltage of the generator and the system voltage, and then increasing the generator excitation to its normal value. Such partial voltage synchronizing arrangements, however, are not entirely satisfactory in certain installations, such, for example, as small automatic hydroelectric plants in which the acceleration of the prime mover through the proper synchronizing speed range during the starting operation of the plant may be so rapid that the automatic synchronizer does not have time to function properly during the short time the generator speed is within the proper synchronizing range. Therefore, it is necessary to provide suitable means for regulating the speed of the prime mover after it has been started so as to maintain the partially excited generator speed within the proper range for effecting the operation of the automatic synchronizing means. Such speed matching means, however, results in an increased cost of the total synchronizing apparatus.

One object of my invention is to provide an improved and relatively inexpensive arrangement of apparatus for controlling the speed of the prime mover driving a synchronous generator so as to bring the generator quickly within the proper synchronizing speed.

Another object of my invention is to provide an improved arrangement of apparatus for controlling both the speed of the prime mover driving the synchronous generator and the connection of the generator to an electric system in response to the relative phase relation of the voltages of the generator in the system.

A further object of my invention is to provide an arrangement for regulating the speed of a prime mover driven synchronous generator so as to bring it within the proper synchronizing range while the generator is excited so as to produce a subnormal voltage thereof, and the fly balls of the governor for the prime mover are driven by an electric motor supplied from the subnormally excited generator.

A still further object of my invention is to provide an arrangement for controlling the connections between the generator and the electric motor driving the fly balls of the governor for a prime mover driven generator, the voltage of which is maintained at a subnormal value during the speed matching and synchronizing operation prior to the generator being connected to the system so that the voltage applied to the motor before the generator is connected to the system is sufficient to cause the motor to operate at substantially its normal operating speed.

Figure 2:
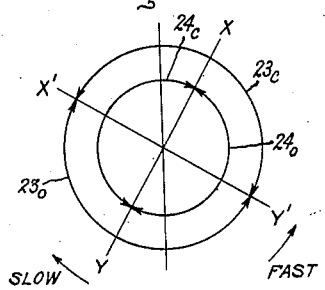

My invention will be better understood from the following description when taken in connection with the accompanying drawing, Fig. 1 of which diagrammatically illustrates the control arrangement for a prime mover electric generating plant embodying my invention, and Fig. 2 of which is an explanatory diagram, and the scope of my invention will be pointed out in the appended claims.

Referring to Fig. 1 of the drawing, I represents a prime mover driving a polyphase synchronous generator 2, which is arranged to be connected to an energized polyphase circuit 3 by means of a suitable circuit breaker 4. The prime mover I is supplied with operating fluid through a valve 5, which is maintained in a position dependent upon the speed of the prime mover I by means of a fly ball governor 6, the fly balls 7 of which are driven by means of an alternating current motor 8, energized from the generator 2. Since the motor 8, when energized at substantially its normal operating voltage, rotates at a speed which varies proportionally with the frequency of the generator 2, the fly balls 7 are normally driven at a speed proportional to the speed of the prime mover I. The position of the fly balls 7 of the governor 6 controls the position of a movable member 9, which in turn controls the operating position of the valve 5. As diagrammatically shown in the drawing, the movable member 9 is in its valve closed position and is held in that position by a closing spring 11 against the bias of an opening spring 12 as long as a governor magnet 13 is deenergized. When it is desired to start the prime mover 1, it is necessary to energize the governor magnet 13, which is so arranged that its energization moves the closing spring 11 out of operative relation with the movable member 9 and allows the opening spring 12 to move the movable member 8 to a valve opening position. When the governor magnet 13 is energized, the gate opening position of the member 9 depends upon the position of the fly balls 7 of the governor 6, and the position of the fly balls 7 for any given speed of the prime mover may be varied by changing the tension of an adjustable spring 14 in any suitable manner. In the particular embodiment of my invention shown in Fig. 1, the tension of the spring 14 is varied by means of a reversible motor 15.

A suitable source of excitation, such as an exciter 16 driven by the prime mover 1, is provided for supplying exciting current to the field winding of the generator 2. A field switch 17 is provided for connecting the exciter 16 and a resistor 18 in series across the terminals of the field winding of the generator 2 so as to produce a predetermined subnormal generator voltage while the generator is being synchronized. A second field switch 19 is provided for connecting the exciter across the terminals of the generator field winding without the resistor 18 being in circuit therewith so that the generator field excitation is sufficient to produce the normal operating voltage. The field switch 19 is arranged to be closed after the generator has been connected to the system 3 by the closing of the circuit breaker 4. The field switch 17 is arranged to be closed whenever the field switch 19 is open and the dynamo-electric plant is in operation. When the field switch 19 is open a field discharge resistor 70 is connected across the terminals of the generator field winding.

For controlling the starting and stopping of the plant, I have shown a manually controlled switch 20, which is closed when the plant is to be placed in operation and which is opened when the plant is to be shut down.

For automatically controlling the speed of the prime mover 1 during the starting operation thereof and while the generator 2 is subnormally excited and for automatically connecting the generator 2 to the circuit 3 when the frequency difference between the generator and the circuit is below a predetermined value and the voltages thereof are within a predetermined phase range, I provide two phase responsive relays 21 and 22, which are connected to the generator 2 and the circuit 3 in any suitable manner, examples of which are well known in the art, so that during each slip cycle when the generator frequency differs from the frequency of the circuit 3, the relay 21 maintains its contacts 23 closed during a predetermined phase range of the voltages and maintains its contacts 23 open during the remaining portion of each slip cycle, and the relay 22 maintains its contacts 24 closed during a different predetermined phase range of the voltages and maintains its contacts 24 open during the remaining portion of each slip cycle. These two predetermined phase ranges during which the contacts 23 or 24 are closed overlap so that during each slip cycle there is a phase range during which both of the contacts 23 and 24 are simultaneously closed, another phase range when only the contacts 23 are closed, another phase range when both of the contacts 23 and 24 are open, and a fourth phase range when only the contacts 24 are closed. For example, if the relay 22 has an operating characteristic corresponding to XY in Fig. 2 so that the contacts 24 are closed during the phase range $24_c$ and are open during the phase range $24_o$, and the relay 21 has an operating characteristic corresponding to X'Y' in Fig. 2 so that its contacts 23 are closed during the phase range $23_c$ and are open during the phase range $23_o$, the two contacts 23 and 24 are simultaneously closed during the phase range XX' near phase coincidence of the voltages and are simultaneously open during the phase range YY' near phase opposition of the voltages, and only the contacts 23 are closed during the phase range XY' and only the contacts 24 are closed during the phase range X'Y. For the purpose of this description, it will be assumed that when the generator frequency is higher than the system frequency, the generator voltage vector rotates counterclockwise with respect to the system voltage vector, and therefore, when the generator frequency is lower than the system frequency, the generator voltage vector rotates clockwise with respect to the system voltage vector. If the relays 21 and 22 have the operating characteristic shown in Fig. 2, it is apparent that during each slip cycle when the generator frequency is too high, the relay contacts 23 are the first to be closed after both contacts are simultaneously open, then the contacts 24 are closed, then the contacts 23 are opened, and finally the contacts 24 are opened whereas during each slip cycle when the generator frequency is too low, contacts 24 are the first to be closed after both contacts are simultaneously open, then the contacts 23 are closed, then the contacts 24 are opened, and finally the contacts 23 are opened. In accordance with my invention, I selectively control the operation of the governor speed adjusting motor 15 in accordance with the order in which the contacts 23 and 24 are operated and also control the closing of the circuit breaker 4 in accordance with the order in which the contacts 23 and 24 are closed and the length of time that elapses between the closures thereof.

When during any slip cycle the contacts 24 are the first to be closed after both of the contacts 23 and 24 are simultaneously open, the contacts 24 complete an energizing circuit for an associated control relay 25, which in turn effects the energization of another control relay 26 and prevents the subsequent closing of the contacts 23 from effecting the energization of a control relay 27 associated therewith. The control relay 26, when energized, completes a holding circuit for itself which remains completed as long as either the contacts 23 or the contacts 24 are closed so that the relay 26 remains energized over the phase range YX'XY' in Fig. 2. The energization of the control relay 26 also initiates the timing operation of a suitable timing device, such as a time relay 28, and also completes an energizing circuit for governor speed adjusting motor 15 so that during each slip cycle it operates in a direction to effect an increase in the speed of the prime mover 1 and in the frequency of the generator 2 during the same phase range YX'XY' of each slip cycle unless the frequency difference is so low that the timing device 28 completes its timing operation and opens the energizing circuit for the motor 15 while the voltages are still within the phase range Y'XX'Y.

When the contacts 23 are the first to be closed after both of the contacts 23 and 24 are simultaneously open during a slip cycle, the contacts 23 complete an energizing circuit for the associated control relay 27, which prevents the subsequent closing of the contacts 24 of the relay 22 from effecting the energizing of the associated control relay 26. The control relay 27, when energized, completes a holding circuit for itself which remains completed as long as either the contacts 23 or the contacts 24 are closed so that the relay 27 remains energized over the phase range Y'XX'Y of Fig. 2. The energization of the control relay 27 also initiates the operation of suitable timing means, such as a time relay 29, and also completes an energizing circuit for the governor speed adjusting motor 15 so that it operates in a direction to effect a decrease in the speed of the prime mover 1 and in the frequency of the generator 2 during the phase range Y'XX'Y of each slip cycle unless the frequency difference is low enough to allow the time relay 29 to complete its timing operation and interrupt the energizing circuit for the motor 15 while the voltages are still within the phase range Y'XX'Y.

From the above description it will be observed that when either the relay 26 or 27 is moved from its normal position to its energized or operated position it remains in its energized or operated position as long as the voltages of the generator 2 and the circuit 3 remain within the phase range Y'XX'Y.

The governor speed adjusting motor 15 is therefore operated during a portion of each slip cycle to adjust the setting of the governor 6 in the proper manner to decrease the frequency difference between the generator 2 and the system 3.

In order to close the circuit breaker 4, I provide, in the embodiment of my invention shown in Fig. 1, an arrangement for closing the circuit breaker only when the generator frequency is above the system frequency and the frequency difference is less than a predetermined value and the voltages of the generator and the system are within a predetermined phase range. This result is accomplished by having the control relay 27, which is energized only when the generator frequency is higher than the system frequency, effect the energization of an associated control relay 30 and the timing operation of a suitable timing device, such as a time relay 31. If the frequency difference is so small that the time relay 31 completes its timing operation before the contacts 24 of the relay 22 are subsequently closed to effect the energization of the associated control relay 25, an energizing circuit is completed for a control relay 32. The control relay 32 in turn prepares an energizing circuit for the closing coil 33 of the circuit breaker 4 which is completed as soon as the relay 25 is subsequently energized by the closing of the contacts 24 of the relay 22. As soon as the circuit breaker 4 closes, a circuit is completed for the field switch 19 so that the generator excitation is increased to its normal value.

If, however, the frequency difference is above a predetermined value while the relay 27 is energized so that the time relay 31 does not complete its timing operation before the control relay 25 is energized in response to the subsequent closing of the contacts 24, the relay 32 is prevented from being energized to effect the closing of the circuit breaker 4 when the control relay 25 becomes energized.

In order that the motor 8, which drives the fly balls 7 of the governor 6, may be energized by a sufficient voltage to cause the motor to operate at substantially synchronous speed while the generator is subnormally excited during the synchronizing operation, suitable voltage transforming means, such as a step-up autotransformer 34, is interposed between the motor 8 and the generator 2 by means of a relay 35 while the generator excitation is subnormal. The relay 35 is controlled by the field switch 17 and the circuit breaker 4 so that the relay is energized to connect the autotransformer 34 in a way to step up the voltage of the generator 2 applied to the motor 8 only while the field switch 17 and the circuit breaker 4 are open.

The operation of the embodiment of my invention shown in Fig. 1 is as follows: When it is desired to start up the plant, the control switch 20 is closed so as to complete an energizing circuit for the governor magnet 13, which moves the closing spring 11 out of operative relation with the movable member 9 of the governor 6 so that the opening spring 12 moves the member 9 in a direction to effect the opening of the valve 5. The closing of the switch 20 also completes an energizing circuit for the operating coil of the field switch 17 through contacts 36 of the field switch 19. The closing of the contacts 37 of the field switch 17 connects the generator field winding and the resistor 18 in series across the terminals of the exciter 16 so that as soon as the prime mover 1 starts to rotate and has accelerated to a predetermined speed, the generator voltage builds up to a predetermined subnormal value. Through contacts 36 on the field switch 19, the switch 20 also completes an energizing circuit for the control relay 35 to interpose the autotransformer 34 between the terminals of the generator 2 and the motor 8. Therefore, by the time the generator has been accelerated to nearly synchronous speed, the fly balls 7 are driven by the motor 8 so as to control the speed of the prime mover in a manner well-known in the art. The energization of the control relay 35 also connects the relays 21 and 22 to the generator 2 so that these relays are operative to close their contacts 23 and 24, respectively, in response to predetermined phase relations of the voltages of the generator 2 and the circuit 3. The closing of the contacts 38 of the field switch 17 completes energizing circuits for the time relays 28, 29, and 31, which respectively include the contacts 40 of the control relay 26, the contacts 41 of the control relay 27, and the contacts 42 of the control relay 27.

For the purpose of describing the operation of the arrangement shown in Fig. 1, it will be assumed that the relays 21 and 22, respectively, have the operating characteristics X'Y' and XY shown in Fig. 2. Therefore, when the frequency of the generator 2 is lower than the frequency of the circuit 3, the relay 22 is the first to close its contacts during each slip cycle after both of the contacts 23 and 24 are simultaneously open. The closing of the contacts 24 of the relay 22, which occurs as soon as the clockwise rotating generator voltage vector in Fig. 2 moves into the phase range 24c, completes an energizing circuit for the control relay 25 through the contacts 38 of the field switch 17. The opening of the contacts 43 of the relay 25 interrupts the energizing circuit of the control relay 27 so that it cannot be energized as long as the relay 25 remains energized. The closing of the contacts 44 of the relay 25 completes an energizing circuit for the control relay 26 through the contacts 45 of the deenergized control relay 27 and the contacts 38 of the field switch 17.

The opening of the contacts 46 of the relay 26 interrupts the energizing circuit of the control relay 27 so that this relay is also prevented from being energized as long as the relay 26 remains energized. The closing of the contacts 47 of the relay 26 completes through contacts 48 of the time relay 28 and the contacts 38 of the field switch 17, an energizing circuit for the governor speed adjusting motor 15 so that the speed governor 6 is adjusted to increase the speed of the prime mover 1 and the frequency of the generator 2. The opening of the contacts 49 of the relay 26 interrupts the energizing circuit of the time relay 28 so that if this relay remains deenergized for a predetermined length of time, it opens its contacts 48 and interrupts the energizing circuit of the speed adjusting motor 15 before this circuit is opened by the relay 26 opening its contacts 47.

When the relay 21 subsequently closes its contacts 23, which occurs when the clockwise rotating generator voltage vector in Fig. 2 moves into the phase range 23c, a locking circuit is completed for the control relay 26 through the contacts 45 of the deenergized control relay 27, the contacts 49 of the relay 26, and the contacts 38 of the field switch 17. Therefore, during each slip cycle when the generator frequency is too low, the relay 26 is energized throughout the phase range YX'XY' of Fig. 2, and the motor 15 remains energized throughout this same phase range unless the frequency difference is below a predetermined value so that the time relay 28 completes its timing operation and opens its contacts 48 while the generator voltage vector is within this phase range.

When the frequency of the generator 2 exceeds the frequency of the circuit 3, the relay 21 is the first to close its contacts during each slip cycle after both of the contacts 23 and 24 are simultaneously open. The closing of the contacts 23, which occurs when the counterclockwise rotating generator voltage vector moves into the phase range 23c of Fig. 2, completes an energizing circuit for the control relay 27 through the contacts 43 of the control relay 25, the contacts 46 of the control relay 26, and the contacts 38 of the field switch 17. The closing of the contacts 53 of the relay 27 completes a shunt circuit around the contacts 43 of the relay 25 so that the subsequent opening of the contacts 43 does not deenergize the control relay 27. The opening of the contacts 45 of the relay 27 interrupts the above-described energizing circuit of the control relay 26 so that this relay cannot be energized as long as the control relay 27 remains energized. The closing of the contacts 50 of the relay 27 completes through the contacts 38 of the field switch 17 and the contacts 51 of the time relay 29, an energizing circuit for the governor speed adjusting motor 15 so that the speed of governor 6 is adjusted to decrease the speed of the prime mover 1 and the frequency of the generator 2. The opening of the contacts 41 of the relay 27 interrupts the energizing circuit of the time relay 29 so that if the relay 29 is deenergized for a predetermined length of time, it opens its contacts 51 and interrupts the energizing circuit of the speed governor adjusting motor 15.

When the relay 22 subsequently closes its contacts 24 in response to the counterclockwise rotating generator voltage vector in Fig. 2 moving into the phase range 24c, the heretofore described energizing circuit for the control relay 25 is completed. The closing of the contacts 44 of the relay 25 completes a locking circuit for the control relay 27 through the contacts 53 of the relay 27, the contacts 46 of the relay 26, the contacts 52 of the relay 27, and the contacts 38 of the field switch 17. Therefore, during each slip cycle when the generator frequency is too high the relay 27 is energized throughout the phase range Y'XX'Y of Fig. 2 and the motor 15 remains energized throughout the same phase range to effect a decrease in the speed of the prime mover 1 unless the frequency difference is below a predetermined value so that the time relay 29 completes its timing operation and opens its contacts 51 while the generator voltage vector is within this predetermined phase range.

The opening of the contacts 42 of the control relay 27 which is energized only when the generator frequency is too high, interrupts the energizing circuit of the time relay 31 so that this relay starts its timing operation. As long as the relay 31 remains in its energized position after the relays 23 and 27 are energized, an energizing circuit is completed for the control relay 30 through the contacts 54 of the time relay 31, the contacts 52 of the relay 27, the contacts 23 of the relay 21 and the contacts 38 of the field switch 17. The closing of the contacts 55 of the relay 30 completes a shunt circuit around the contacts 54 of the relay 31. If the frequency difference exceeds a predetermined amount when the generator frequency is above the frequency of the circuit 3, the time relay 31 does not close its contacts 56 until after the relay 25 has been energized in response to the relay 22 closing its contacts 24, and, therefore, closing the contacts 56 does not effect the energization of the control relay 32. The closing of the contacts 44 of the control relay 25 completes a locking circuit for the relay 30 through the contacts 55 of the relay 30 and the contacts 38 of the field switch 17 so the relay 30 remains energized until the generator voltage vector in Fig. 2 moves into the phase range YY'.

If, however, the frequency difference is small enough so that during a slip cycle the relay 31 closes its contacts 56 while the control relay 25 is still deenergized, namely during the phase range Y'X in Fig. 2, an energizing circuit is completed for the control relay 32 through the contacts 57 of the relay 30, the contacts 56 of the relay 31, the contacts 58 of the relay 25, and the contacts 38 of the field switch 17. The closing of the contacts 59 of the relay 32 completes a shunt circuit around the contacts 56 of the relay 31 and the contacts 58 of the relay 25 so that the relay 31 is not deenergized by the subsequent opening of the contacts 58 of the relay 25. After the relay 32 has been energized, the subsequent closing of the contacts 60 of the control relay 25, when the generator voltage vector in Fig. 2 moves counterclockwise into the phase range 24c completes an energizing circuit for the closing coil 33 of the circuit breaker 4 through the contacts 61 of the relay 30, the contacts 62 of the relay 32, and the contacts 38 of the field switch 17. The closing of the circuit breaker 4 connects the subnormally excited generator 2 to the circuit 3 at a time when the generator voltage vector in Fig. 2 is within the phase range XX', which is a relatively small phase range near phase coincidence of the voltages.

The closing of the contacts 64 on the circuit breaker 4 completes a locking circuit for the closing coil 33 through the switch 20. The closing of the contacts 65 on the circuit breaker 4 completes an energizing circuit for the operating winding of the field switch 19, which, by closing its contacts 66, connects the exciter 16 in circuit with the field winding of the generator 2 without the resistor 18 so that the generator excitation is increased to its normal operating value. The opening of the contacts 26 of the field switch 19 interrupts the energizing circuit of the field switch 17, which in turn, by opening its contacts 38, effects the deenergization of the control relays 25 to 32, inclusive. The opening of the contacts 68 of the circuit breaker 4 interrupts the energizing circuit of the control relay 35 so that it in turn reestablishes the normal connections of the fly ball driving motor 8 so that it is energized directly by the generator voltage.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, two disconnected alternating current circuits, two relays, each relay having a normal position and an operated position, means controlled by the relative phase relation of the voltages of said circuits for effecting the movement of one of said relays from its normal position to its operated position only when the frequency of a predetermined one of said circuits exceeds the frequency of the other circuit and the voltages of said circuits are within a predetermined phase range and for moving the other relay from its normal position to its operated position only when the frequency of said predetermined one of said circuits is below the frequency of the other circuit and the voltages of said circuits are within a different predetermined phase range, and means responsive to the movement of each relay to its operated position for maintaining it in its operated position as long as said voltages remain within either of said phase ranges.

2. In combination, two disconnected alternating current circuits, two relays, means controlled by the relative phase relation of the voltages of said circuits for completing an energizing circuit for one of said relays only when the frequency of a predetermined one of said circuits exceeds the frequency of the other circuit and the voltages of said circuits are within a predetermined phase range and for completing an energizing circuit for the other relay only when the frequency of said predetermined one of said circuits is below the frequency of the other circuit and said voltages are within a different predetermined phase range which overlaps a portion of said first-mentioned phase range, and means responsive to the energization of each relay for maintaining it in its energized position as long as said voltages remain within either of said phase ranges.

3. In combination, two disconnected alternating current circuits, two relays, each relay having a normal position and an operated position, means controlled by the relative phase relation of the voltages of said circuits for effecting the movement of one of said relays from its normal position to its operated position only when the frequency of a predetermined one of said circuits exceeds the frequency of the other circuit and the voltages of said circuits are within a predetermined phase range and for moving the other relay from its normal position to its operated position only when the frequency of said predetermined one of said circuits is below the frequency of the other circuit and the voltages of said circuits are within a different predetermined phase range, means responsive to the movement of each relay to its operated position for maintaining it in its operated position as long as said voltages remain within either of said phase ranges, and means controlled by said relays for varying the frequency of one of said circuits.

4. In combination, two disconnected alternating current circuits, two relays, each relay having a normal position and an operated position, means controlled by the relative phase relation of the voltages of said circuits for effecting the movement of one of said relays from its normal position to its operated position only when the frequency of a predetermined one of said circuits exceeds the frequency of the other circuit and the voltages of said circuits are within a predetermined phase range and for moving the other relay from its normal position to its operated position only when the frequency of said predetermined one of said circuits is below the frequency of the other circuit and the voltages of said circuits are within a different predetermined phase range, means responsive to the movement of each relay to its operated position for maintaining it in its operated position as long as said voltages remain within either of said phase ranges, and synchronizing means for connecting said circuits together controlled by said relays.

5. In combination, two disconnected alternating current circuits, two relays, each relay having a normal position and an operated position, means controlled by the relative phase relation of the voltages of said circuits for effecting the movement of one of said relays from its normal position to its operated position only when the frequency of a predetermined one of said circuits exceeds the frequency of the other circuit and the voltages of said circuits are within a predetermined phase range and for moving the other relay from its normal position to its operated position only when the frequency of said predetermined one of said circuits is below the frequency of the other circuit and the voltages of said circuits are within a different predetermined phase range, means responsive to the movement of each relay to its operated position for maintaining it in its operated position as long as said voltages remain within either of said phase ranges, means controlled by one of said relays when in its operated position for effecting an increase in the frequency of one of said circuits, and means controlled by the other of said relays when in its operated position for effecting a decrease in the frequency of said last mentioned circuit.

6. In combination, two disconnected alternating current circuits, two relays, each relay having a normal position and an operated position, means controlled by the relative phase relation of the voltages of said circuits for effecting the movement of one of said relays from its normal position to its operated position only when the frequency of a predetermined one of said circuits exceeds the frequency of the other circuit and the voltages of said circuits are within a predetermined phase range and for moving the other relay from its normal position to its operated position only when the frequency of said predetermined one of said circuits is below the frequency of the other circuit and the voltages of said circuits are within a different predetermined phase range, means responsive to the movement of each relay to its operated position for maintaining it in its operated position as long as said voltages remain within either of said phase ranges, means controlled by one of said relays when in its operated position for effecting an increase in the frequency of one of said circuits, means controlled by the other of said relays when in its operated position for effecting a decrease in the frequency of said last mentioned circuit, and means for limiting the maximum length of time that a relay when in its operated position can effect a change in the frequency of said last mentioned circuit.

7. In combination, two disconnected alternating current circuits, two sets of contacts, means controlled by the relative phase relation of the voltages of said circuits for closing said contacts in a predetermined order and subsequently opening said contacts in the same predetermined order during each slip cycle when the frequency of a predetermined one of said circuits exceeds the frequency of the other circuit and for closing said contacts in the reverse order and subsequently opening said contacts in said reverse order during each slip cycle when the frequency of said predetermined one of said circuits is less than the frequency of the other circuit, two relays, means for energizing one of said relays in response to the closing of a predetermined set of said contacts when the other set of contacts is open and for preventing the other relay from being energized while said one of said relays is energized, means for energizing the other of said relays in response to the closing of the other of said sets of contacts when said predetermined set of contacts is open and for preventing said one of said relays from being energized while said other of said relays is energized, and means responsive to the energization of each relay for maintaining it energized as long as either set of contacts remains closed.

8. In combination, two disconnected alternating current circuits, two sets of contacts, means controlled by the relative phase relation of the voltages of said circuits for closing said contacts in a predetermined order and subsequently opening said contacts in the same predetermined order during each slip cycle when the frequency of a predetermined one of said circuits exceeds the frequency of the other circuit and for closing said contacts in the reverse order and subsequently opening said contacts in said reverse order during each slip cycle when the frequency of said predetermined one of said circuits is less than the frequency of the other circuit, two relays, means for energizing one of said relays in response to the closing of a predetermined set of said contacts when the other set of contacts is open and for preventing the other relay from being energized while said one of said relays is energized, means for energizing the other of said relays in response to the closing of the other of said sets of contacts when said predetermined set of contacts is open and for preventing said one of said relays from being energized while said other of said relays is energized, means responsive to the energization of each relay for maintaining it energized as long as either set of contacts remains closed, means controlled by one of said relays when energized for effecting an increase in the frequency of one of said circuits, and means controlled by the other of said relays when energized for effecting a decrease in the frequency of said last mentioned circuit.

9. In combination, two disconnected alternating current circuits, two sets of contacts, means controlled by the relative phase relation of the voltages of said circuits for closing said contacts in a predetermined order and subsequently opening said contacts in the same predetermined order during each slip cycle when the frequency of a predetermined one of said circuits exceeds the frequency of the other circuit and for closing said contacts in the reverse order and subsequently opening said contacts in said reverse order during each slip cycle when the frequency of said predetermined one of said circuits is less than the frequency of the other circuit, two relays, means for energizing one of said relays in response to the closing of a predetermined set of said contacts when the other set of contacts is open and for preventing the other relay from being energized while said one of said relays is energized, means for energizing the other of said relays in response to the closing of the other of said sets of contacts when said predetermined set of contacts is open and for preventing said one of said relays from being energized while said other of said relays is energized, means responsive to the energization of each relay for maintaining it energized as long as either set of contacts remains closed, means controlled by one of said relays when energized for effecting an increase in the frequency of one of said circuits, means controlled by the other of said relays when energized for effecting a decrease in the frequency of said last mentioned circuit, and means for limiting the maximum length of time that a relay when energized can effect a change in the frequency of said last mentioned circuit.

10. In combination, two disconnected alternating current circuits, two sets of contacts, means controlled by the relative phase relation of the voltages of said circuits for closing said contacts in a predetermined order and subsequently opening said contacts in the same predetermined order during each slip cycle when the frequency of a predetermined one of said circuits exceeds the frequency of the other circuit and for closing said contacts in the reverse order and subsequently opening said contacts in said reverse order during each slip cycle when the frequency of said predetermined one of said circuits is less than the frequency of the other circuit, means responsive to the closing of a predetermined set of contacts when the other set is open for effecting an increase in the frequency of one of said circuits as long as either of said sets of contacts remains closed, and means responsive to the closing of said other set of contacts when said predetermined set of contacts is open for effecting a decrease in the frequency of said last mentioned circuit as long as either of said sets of contacts remains closed.

11. In combination, two disconnected alternating current circuits, two sets of contacts, means controlled by the relative phase relation of the voltages of said circuits for closing said contacts in a predetermined order and subsequently opening said contacts in the same predetermined order during each slip cycle when the frequency of a predetermined one of said circuits exceeds the frequency of the other circuit and for closing said contacts in the reverse order and subsequently opening said contacts in said reverse order during each slip cycle when the frequency of said predetermined one of said circuits is less than the frequency of the other circuit, means responsive to the closing of a predetermined set of contacts when the other set is open for effecting an increase in the frequency of one of said circuits as long as either of said sets of contacts remains closed, means responsive to the closing of said other set of contacts when said predetermined set of contacts is open for effecting a decrease in the frequency of said last mentioned circuit as long as either of said sets of contacts remains closed, and means for limiting the maximum length of time said contacts can effect a change in the frequency of said last mentioned circuit during each slip cycle.

12. In combination, two disconnected alternating current circuits, two sets of contacts, means controlled by the relative phase relation of the voltages of said circuits for closing said sets of contacts in a predetermined order and for subsequently opening said contacts during each slip cycle when the frequency of a predetermined one of said circuits exceeds the frequency of the other circuit and for closing said sets of contacts in the reverse order and for subsequently opening said contacts during each slip cycle when the frequency of said predetermined one of said circuits is below the frequency of the other circuit, a relay, means controlled by said contacts for completing an energizing circuit in response to the closing of a predetermined one of said sets of contacts only when said predetermined one of said contacts is the first to be closed after both sets of contacts are simultaneously open during a slip cycle, and means for connecting said circuits together in response to the next closing of said other contacts after said relay is energized only when more than a predetermined time elapses between said energization of said relay and the closing of said other contacts.

13. In combination, two disconnected alternating current circuits, two sets of contacts, means controlled by the relative phase relation of the voltages of said circuits for closing said sets of contacts in a predetermined order and for subsequently opening said contacts during each slip cycle when the frequency of a predetermined one of said circuits exceeds the frequency of the other circuit and for closing said sets of contacts in the reverse order and for subsequently opening said contacts during each slip cycle when the frequency of said predetermined one of said circuits is below the frequency of the other circuit, a relay, means controlled by said contacts for completing an energizing circuit in response to the closing of a predetermined one of said sets of contacts only when said predetermined one of said contacts is the first to be closed after both sets of contacts are simultaneously open during a slip cycle, timing means responsive to the energization of said relay, and means controlled by said timing means and said other contacts for connecting said circuits together only when said timing means has completed its timing operation prior to the next closing of said other contacts after said relay is energized.

14. In combination, two disconnected alternating current circuits, two sets of contacts, means controlled by the relative phase relation of the voltages of said circuits for closing said sets of contacts in a predetermined order and for subsequently opening said contacts during each slip cycle when the frequency of a predetermined one of said circuits exceeds the frequency of the other circuit and for closing said sets of contacts in the reverse order and for subsequently opening said contacts during each slip cycle when the frequency of said predetermined one of said circuits is below the frequency of the other circuit, a relay, means controlled by said contacts for completing an energizing circuit in response to the closing of a predetermined one of said sets of contacts only when said predetermined one of said contacts is the first to be closed after both sets of contacts are simultaneously open during a slip cycle, timing means responsive to the energization of said relay, a control relay, means controlled by said timing means and said other contacts for completing an energizing circuit for said control relay when said timing means completes its timing operation while said other contacts are open, and means responsive to the closing of said other contacts while said control relay is energized for effecting the connection of said circuits together.

15. An arrangement for synchronizing an alternating current generator with an energized alternating current system comprising means for exciting said generator so that its voltage is below its normal operating value, means controlled by the relative phase relation of the voltages of said system and the subnormal voltage of said generator for regulating the speed of said generator to reduce the frequency difference, and for connecting said generator to said system when the frequency difference is below a predetermined value, and means responsive to the connection of said generator to said system for increasing the excitation of said generator.

16. An arrangement for synchronizing an alternating current generator with an energized alternating current system comprising means for exciting said generator so that its voltage is materially below its normal value, means controlled by the relative phase relation of the voltages of said system and the subnormal voltage of said generator for regulating the speed of said generator to reduce the frequency difference and for connecting said generator to said system when the frequency difference is below a predetermined value and a predetermined phase relation exists between said voltages, and means responsive to the connection of said generator to said system for increasing the excitation of said generator.

17. In combination, an energized alternating current system, a prime mover, a generator driven by said prime mover, means for exciting said generator so that the voltage thereof is below its normal operating value, a fly ball governor for controlling the speed of said prime mover, an electric motor energized from said generator and driving the fly balls of said governor, means for connecting said subnormally excited generator to said system and subsequently increasing the excitation of said generator, and means for controlling the connections between said generator and motor so that a sufficient voltage is applied to said motor to cause it to operate at substantially synchronous speed both before and after said generator is connected to said system.

18. In combination, an energized alternating current system, a prime mover, a generator driven by said prime mover, means for exciting said generator so that the voltage thereof is below its normal operating value, a fly ball governor for controlling the speed of said prime mover, an electric motor driving the fly balls of said governor, means controlled by the relative phase relation of the voltage of said system and the subnormal voltage of said generator for controlling said governor to vary the speed of said generator to decrease the frequency difference between said generator and system and for effecting the connection of said generator to said system when the frequency difference is below a predetermined value, means for increasing the excitation of said generator after said generator is connected to said system, and means for controlling the connection between said generator and motor so that a sufficient voltage is applied to said motor to cause it to operate at substantially synchronous speed both before and after said generator is connected to said system.

19. In combination, an energized alternating current system, a prime mover, a generator driven by said prime mover, means for exciting said generator so that the voltage thereof is below its normal operating value, a fly ball governor for controlling the speed of said prime mover, an electric motor driving the fly balls of said governor, means controlled by the relative phase relation of the voltage of said system and the subnormal voltage of said generator for controlling said governor to vary the speed of said generator to decrease the frequency difference between said generator and system and for effecting the connection of said generator to said system when the frequency difference is below a predetermined value, means for increasing the excitation of said generator after said generator is connected to said system, step-up voltage transforming means, and means for interposing said transforming means between said motor and generator while said generator is disconnected from said system.

HAROLD T. SEELEY.